United States Patent
Murata et al.

(10) Patent No.: US 10,520,085 B2
(45) Date of Patent: Dec. 31, 2019

(54) COMBINED OIL RING

(71) Applicant: NIPPON PISTON RING CO., LTD, Saitama-shi, Saitama (JP)

(72) Inventors: Yasuyuki Murata, Saitama (JP); Kenji Arai, Saitama (JP); Ryosuke Kamata, Saitama (JP); Hideshi Hitosugi, Saitama (JP); Kazumoto Takahashi, Saitama (JP); Toru Tsukui, Saitama (JP)

(73) Assignee: NIPPON PISTON RING CO., LTD., Saitama (JP)

( * ) Notice: Subject to any disclaimer, the term of this patent is extended or adjusted under 35 U.S.C. 154(b) by 0 days.

(21) Appl. No.: 15/560,579

(22) PCT Filed: Mar. 31, 2016

(86) PCT No.: PCT/JP2016/060747
§ 371 (c)(1),
(2) Date: Sep. 22, 2017

(87) PCT Pub. No.: WO2016/159269
PCT Pub. Date: Oct. 6, 2016

(65) Prior Publication Data
US 2018/0051806 A1    Feb. 22, 2018

(30) Foreign Application Priority Data

Mar. 31, 2015    (JP) ................................ 2015-071273

(51) Int. Cl.
*F16J 9/06*    (2006.01)
(52) U.S. Cl.
CPC ..................................... *F16J 9/066* (2013.01)

(58) Field of Classification Search
CPC ........ F16J 9/26; F16J 9/066; F16J 9/06; F16J 9/068; F16J 9/12; F16J 9/067; F16J 9/145; F16J 9/203
See application file for complete search history.

(56) References Cited

U.S. PATENT DOCUMENTS 2,854,301 A * 9/1958 Lutz .......................... F16J 9/063
267/1.5
2,904,377 A * 9/1959 Endres ..................... F16J 9/068
267/1.5
(Continued)

FOREIGN PATENT DOCUMENTS

CN          106471292 A      3/2017
EP           2703695 A1       3/2014
(Continued)

OTHER PUBLICATIONS

International Search Report for PCT/JP2016/060747 dated Jul. 5, 2016.

*Primary Examiner* — Eugene G Byrd
(74) *Attorney, Agent, or Firm* — Sughrue Mion, PLLC

(57) ABSTRACT

A combined oil ring in which carbon sludge and the like are not deposited between side rails and a spacer expander even if an internal combustion engine is operated for a long period of time. The combined oil ring includes an outer circumferential end portion of a space forming part and a continuous part that are closed and not open toward the outer circumferential side, thereby reducing carbon sludge deposits.

7 Claims, 4 Drawing Sheets

(56) References Cited

U.S. PATENT DOCUMENTS

| | | | | |
|---|---|---|---|---|
| 3,695,622 | A * | 10/1972 | Davis | F16J 9/063 277/435 |
| 3,759,148 | A * | 9/1973 | Geffroy | F02F 3/00 277/451 |
| 4,111,437 | A * | 9/1978 | Saylor | F16J 9/066 277/435 |
| 4,115,959 | A * | 9/1978 | McCormick | C23C 4/10 51/295 |
| 4,194,747 | A * | 3/1980 | Nisper | F16J 9/069 267/1.5 |
| 4,429,885 | A * | 2/1984 | Chiba | F16J 9/068 267/1.5 |
| 4,542,907 | A * | 9/1985 | Chiba | F16J 9/067 267/1.5 |
| 4,548,416 | A * | 10/1985 | Maeda | F16J 9/069 267/1.5 |
| 4,759,266 | A * | 7/1988 | Murray | F16J 9/066 277/480 |
| 4,762,329 | A * | 8/1988 | Koorooki | F16J 9/066 267/1.5 |
| 5,129,661 | A * | 7/1992 | Ono | F16J 9/066 277/479 |
| 5,195,758 | A * | 3/1993 | Erway | F16J 9/066 267/1.5 |
| 5,469,616 | A * | 11/1995 | Miyazaki | F16J 9/066 29/888.07 |
| 5,718,437 | A * | 2/1998 | Tanaka | F16J 9/066 277/443 |
| 5,794,941 | A * | 8/1998 | Lahrman | F16J 9/063 277/441 |
| 7,036,823 | B2 * | 5/2006 | Takiguchi | F16J 9/064 277/434 |
| 7,044,472 | B2 * | 5/2006 | Takahashi | F16J 9/067 277/434 |
| 7,854,191 | B2 * | 12/2010 | Kariya | F16J 9/068 92/160 |
| 8,835,549 | B2 * | 9/2014 | Gao | C09D 4/00 427/255.14 |
| 2002/0070507 | A1 * | 6/2002 | Heraud | F16J 9/062 277/434 |
| 2004/0262847 | A1 * | 12/2004 | Inoue | C23C 8/02 277/443 |
| 2006/0027976 | A1 * | 2/2006 | Usui | F16J 9/062 277/434 |
| 2006/0061043 | A1 * | 3/2006 | Takahashi | F16J 9/068 277/434 |
| 2006/0113730 | A1 * | 6/2006 | Suzuki | F16J 9/062 277/434 |
| 2006/0169135 | A1 * | 8/2006 | Usui | F16J 9/068 92/248 |
| 2008/0122185 | A1 * | 5/2008 | Katou | F16J 9/062 277/434 |
| 2011/0221141 | A1 * | 9/2011 | Ayuzawa | F16J 9/068 277/434 |
| 2013/0181410 | A1 * | 7/2013 | Chiba | F16J 9/062 277/443 |
| 2014/0021686 | A1 * | 1/2014 | Takahashi | F16J 9/066 277/442 |
| 2014/0062030 | A1 * | 3/2014 | Hitosugi | F16J 9/068 277/489 |
| 2014/0246834 | A1 | 9/2014 | Ayuzawa et al. | |
| 2015/0240945 | A1 * | 8/2015 | Favaron | F16J 9/064 277/442 |

FOREIGN PATENT DOCUMENTS

| | | |
|---|---|---|
| EP | 2778481 A1 | 9/2014 |
| JP | 2011-185383 A | 9/2011 |
| JP | 2012-233572 A | 11/2012 |
| JP | 2014-040914 A | 3/2014 |
| JP | 2014-209018 A | 11/2014 |

* cited by examiner

COMBINED OIL RING

CROSS REFERENCE TO RELATED APPLICATIONS

This application is a National Stage of International Application No. PCT/JP2016/060747 filed Mar. 31, 2016, claiming priority based on Japanese Patent Application No. 2015-071273 filed Mar. 31, 2015, the contents of all of which are incorporated herein by reference in their entirety.

TECHNICAL FIELD

The present invention relates to a combined oil ring, and, more particularly, to a three-piece combined oil ring including a pair of upper and lower side rails and a spacer expander arranged therebetween.

BACKGROUND ART

Oil rings that have been known up to now scrape extra engine oil attached to a cylinder inner wall surface of an internal combustion engine, and form a proper oil film, to thereby prevent seizure of a piston along with an operation of the internal combustion engine. Various forms have been known for such oil rings. For example, Patent Document below describes a combined oil ring including a pair of upper and lower side rails and a spacer expander arranged therebetween. The spacer expander includes: a large number of upper pieces and lower pieces that are alternately arranged in a circumferential direction so as to be spaced apart in an axial direction and the circumferential direction; coupling pieces that respectively couple the adjacent upper pieces and lower pieces; and ear parts that are each formed so as to erect in an inner circumferential end portion of each of the upper pieces and the lower pieces, and serve to push the side rails.

CITATION LIST

Patent Literature

Patent Literature 1: Japanese Patent Laid-Open No. 2011-185383

As described above, combined oil rings scrape extra engine oil attached to a cylinder inner wall surface of an internal combustion engine, and form a proper oil film, to thereby prevent seizure of a piston. Unfortunately, such combined oil rings have a problem that carbon sludge and the like generated from unburned carbon and lubricant combustion products are deposited between the spacer expander and the side rails, and hinder smooth scraping of the engine oil.

In order to solve this problem, for example, in the combined oil ring described in Patent Literature 1, at least one of an upper surface of each upper piece and a lower surface of each lower piece has a groove formed thereon, and each ear part has, formed therein, a through-hole with which the groove is communicated. The scraped engine oil flows out through the groove and the through-hole. Additionally, a side rail support part that is higher than the upper surface of the upper piece or the lower surface of the lower piece is formed in an outer circumferential end portion of the upper piece or the lower piece, so that a step is formed between the side rail and the spacer expander. Hence, carbon sludge is prevented from being deposited between the spacer expander and the side rails.

SUMMARY OF INVENTION

Technical Problem

In conventional combined oil rings, the step of the side rail support part is formed larger or the groove is formed deeper, to prevent the above-mentioned deposition of carbon sludge more effectively. Unfortunately, carbon sludge is still likely to be deposited particularly in a narrowest portion in a space between the side rails and the spacer expander or in corner parts in which the side rails and the spacer expander are in contact with each other. Hence, the conventional combined oil rings still have a problem that, if the internal combustion engine is operated for a long period of time, carbon sludge is gradually deposited in these portions, and hinders the engine oil from smoothly flowing out.

The present invention, which has been made in view of the above-mentioned problem, has an object to provide a combined oil ring in which carbon sludge is not deposited between side rails and a spacer expander even if an internal combustion engine is operated for a long period of time.

Solution to Problem

A combined oil ring according to the present invention is configured to be fitted in an oil ring groove of a piston, and includes: a pair of upper and lower flat plate-like circular side rails; and a spacer expander arranged between the pair of upper and lower side rails. The spacer expander includes: a large number of upper pieces and lower pieces that are alternately arranged in a circumferential direction so as to be spaced apart in an axial direction and the circumferential direction; coupling pieces that respectively couple the adjacent upper pieces and lower pieces; and ear parts that are each formed so as to erect in an inner circumferential end portion of each of the upper pieces and the lower pieces, and serve to push the side rails. A side rail support part that abuts on the side rail is provided in an outer circumferential end portion of at least one of an upper surface of each upper piece and a lower surface of each lower piece. A space forming part spaced apart from the side rail support part in the axial direction is provided in the upper surface of the upper piece or the lower surface of the lower piece, such that a space is formed between the side rail and the upper surface of the upper piece or the lower surface of the lower piece. The space forming part and the side rail support part are continuous in the radial direction through a continuous part. A groove that is communicated with a through-hole in the ear part is formed in the space forming part along the radial direction. An outer circumferential end portion of the space forming part and the continuous part are not open toward the outer circumferential side and are closed.

In the combined oil ring according to the present invention, it is preferable that the continuous part have a step that is formed substantially parallel to the side rail support part or the space forming part.

In the combined oil ring according to the present invention, it is preferable that the continuous part extend in a circular arc shape in axial section, from an inner circumferential end portion of the side rail support part toward the space forming part.

In the combined oil ring according to the present invention, it is preferable that the groove be formed into a substantial V shape protruding upward or downward in the axial direction.

In the combined oil ring according to the present invention, it is preferable that the ear part have a trapezoidal shape when observed from an outer diameter direction.

In the combined oil ring according to the present invention, it is preferable that a shape of the through-hole when observed from an outer diameter direction be substantially similar to an outer shape of the ear part.

In the combined oil ring according to the present invention, it is preferable that a length along the axial direction from an upper surface or a lower surface of the side rail support part to the continuous part be set smaller than a plate thickness of the spacer expander.

In the combined oil ring according to the present invention, it is preferable that a length of the continuous part in the radial direction be set to be equal to or less than 0.2 mm.

In the combined oil ring according to the present invention, it is preferable that a depth of the groove be set to be equal to or more than 0.10 mm.

Advantageous Effects of Invention

The combined oil ring according to the present invention includes the space forming part that is spaced apart from the side rail support part in the axial direction, the space forming part and the side rail support part are continuous through the continuous part, the groove that is communicated with the through-hole in the ear part is formed in the space forming part along the radial direction, and the outer circumferential end portion of the space forming part and the continuous part are not open toward the outer circumferential side and are closed. Accordingly, a large space defined by the ear part, the space forming part, the continuous part, and the side rail support part can be secured, whereby a larger amount of engine oil can be discharged from the through-hole and deposition of carbon sludge between the side rail and the spacer expander can be prevented.

In the combined oil ring according to the present invention, the continuous part has a step. Accordingly, the continuous part can be formed easily, and a larger amount of engine oil can be discharged from the through-hole, whereby deposition of carbon sludge can be prevented.

In the combined oil ring according to the present invention, the continuous part is formed into a circular arc shape in axial section. Accordingly, engine oil is allowed to smoothly flow out along the circular arc shape.

In the combined oil ring according to the present invention, the groove is formed into a substantial V shape protruding upward or downward in the axial direction. Accordingly, a large volume of space between the side rail and the spacer expander can be secured, and engine oil is allowed to smoothly flow out through the through-hole, whereby deposition of carbon sludge can be prevented.

In the combined oil ring according to the present invention, the ear part has a trapezoidal shape when observed from an outer diameter direction. Accordingly, the through-hole can be formed larger, and a larger amount of engine oil can be discharged from the through-hole, whereby deposition of carbon sludge can be prevented.

In the combined oil ring according to the present invention, a shape of the through-hole when observed from the outer diameter direction is substantially similar to an outer shape of the ear part. Accordingly, a larger amount of engine oil can be discharged from the through-hole, whereby deposition of carbon sludge can be prevented.

In the combined oil ring according to the present invention, the distance to the continuous part is set smaller than a plate thickness of the spacer expander, and the radial direction of the continuous part and depth of the groove are formed in a predetermined size. Accordingly, the side rail support part can be kept closed without forming a through-hole and being open toward the outer circumferential side. With this, a larger space forming part can be formed to allow a larger amount of engine oil to flow out from the through-hole, whereby deposition of carbon sludge can be prevented.

DESCRIPTION OF EMBODIMENTS

Hereinafter, a preferred embodiment for carrying out the present invention is described with reference to the drawings. The following embodiment does not limit an aspect of the present invention according to each claim, and all combinations of features described in the embodiment are not necessarily essential to solutions provided by the present invention.

Figure 1:
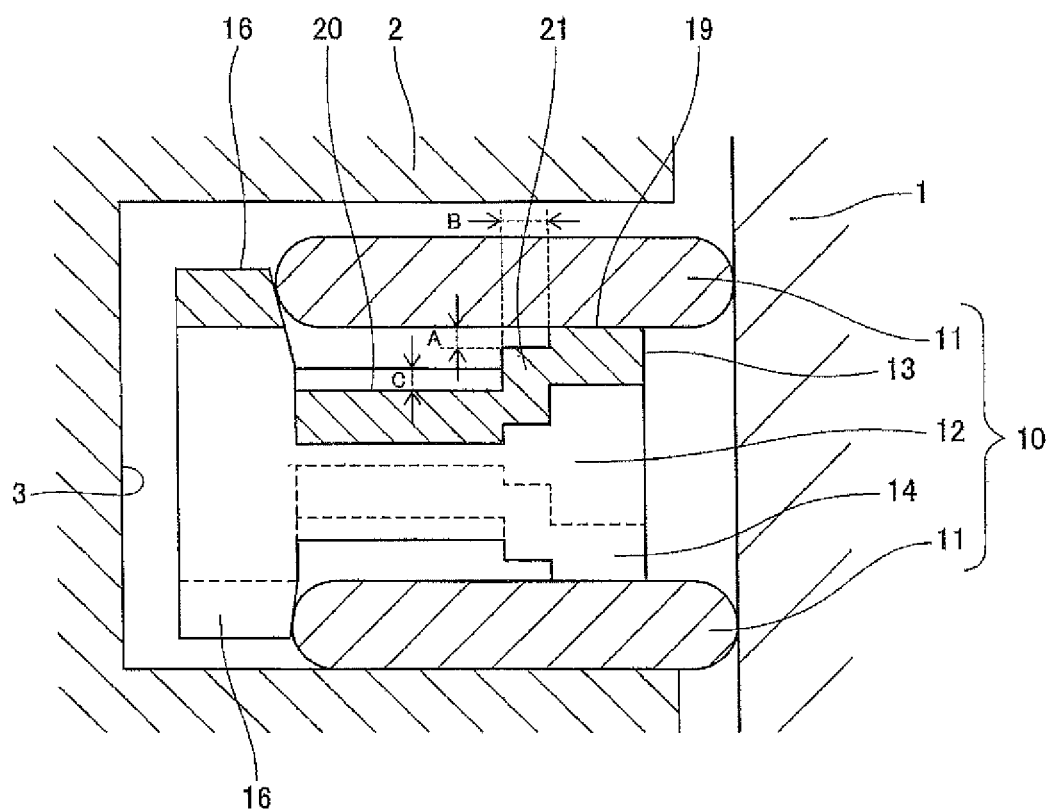
FIG. 1 is a sectional view illustrating a main part of an internal combustion engine in which a combined oil ring according to an embodiment of the present invention is assembled, which is cut at a top of an ear part in a cylinder axial direction of the internal combustion engine.
Figure 2:
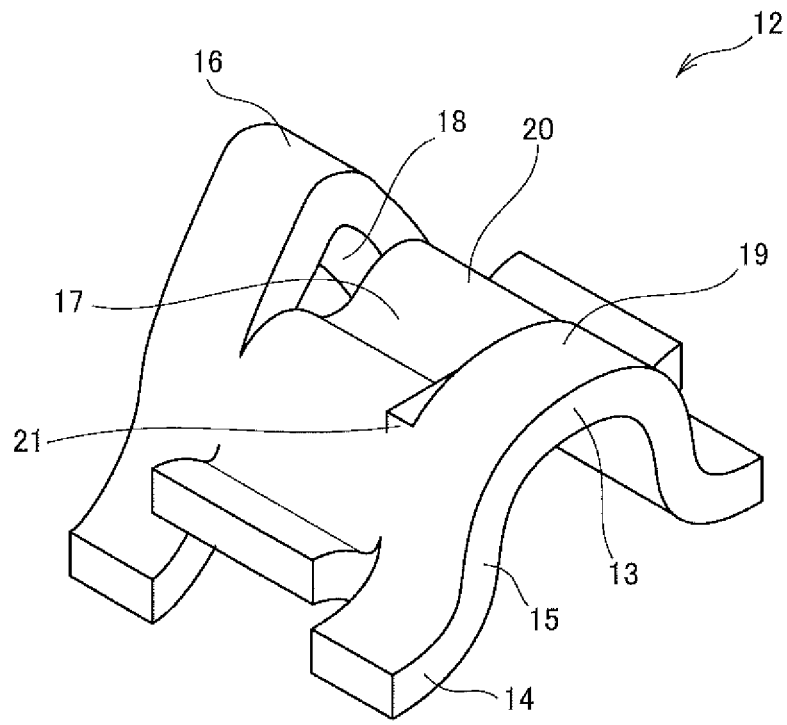
FIG. 2(a) is a perspective view illustrating part of a spacer expander used for the combined oil ring according to the embodiment of the present invention.
FIG. 2(b) is a perspective view illustrating a variation of a spacer expander used for the combined oil ring according to the embodiment of the present invention.
Figure 2:
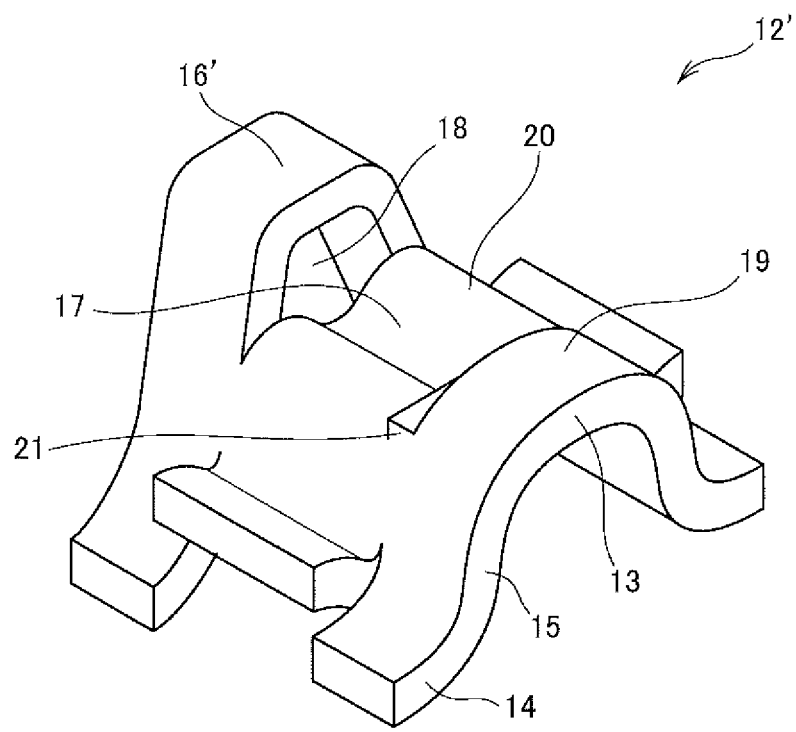
Figure 3:
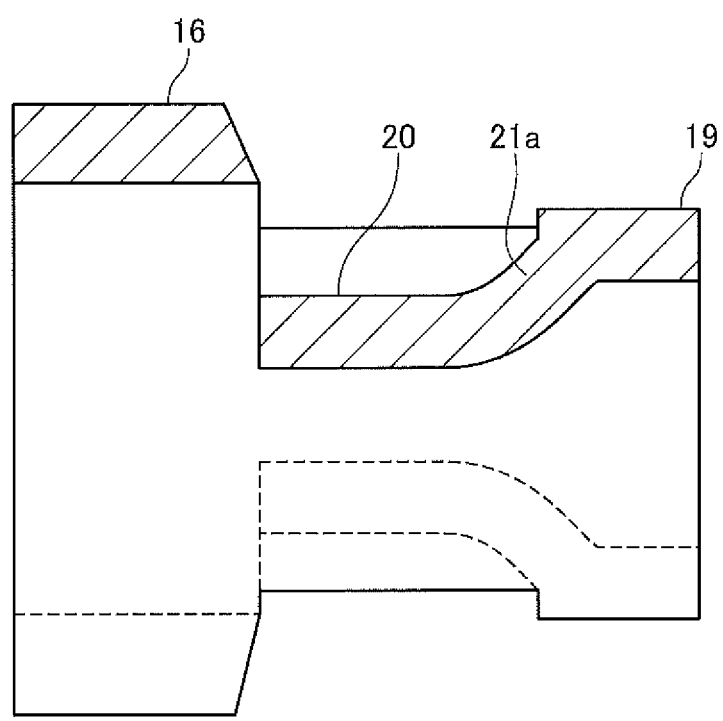
FIG. 3 shows a variation of the spacer expander used for the combined oil ring according to the embodiment of the present invention.

FIG. 1 is a sectional view illustrating a main part of an internal combustion engine in which a combined oil ring according to the embodiment of the present invention is assembled, which is cut at a top of an ear part in a cylinder axial direction of the internal combustion engine. FIG. 2(a) is a perspective view illustrating part of a spacer expander used for the combined oil ring according to the embodiment of the present invention. FIG. 2(b) is a perspective view illustrating a variation of a spacer expander used for the combined oil ring according to the embodiment of the present invention. FIG. 3 is a variation of the spacer expander used for the combined oil ring according to the embodiment of the present invention.

As illustrated in FIG. 1, a combined oil ring 10 according to the present embodiment is assembled in an oil ring groove 3 formed on an outer circumferential surface of a piston 2 of the internal combustion engine so as to be in sliding contact with an inner wall of the cylinder 1, and the combined oil ring 10 thus scrapes extra engine oil attached to the inner wall of the cylinder 1, to thereby form a proper oil film on the inner wall of the cylinder 1.

The combined oil ring 10 includes a pair of upper and lower side rails 11, 11 and a spacer expander 12 arranged between the pair of upper and lower side rails 11, 11. The side rails 11, 11 and the spacer expander 12 are made of steel or the like, and each side rail 11 is configured as a flat plate-like circular ring including a gap (not illustrated).

As illustrated in FIG. 2(a), the spacer expander 12 is formed by plasticity processing of a steel material, and has a concavo-convex shape (corrugated shape) along an axial direction as well as a substantially circular shape along a circumferential direction. This concavo-convex shape in the axial direction defines upper pieces 13 and lower pieces 14 in an end portion in the axial direction. Specifically, the spacer expander 12 includes a large number of the upper pieces 13 and the lower pieces 14 that are alternately arranged in the circumferential direction so as to be spaced apart in the axial direction and the circumferential direction. Coupling pieces 15 respectively couple the adjacent upper pieces 13 and lower pieces 14.

As illustrated in FIG. 1, ear parts 16 are each formed so as to erect in an arch-like shape in an inner circumferential end portion of each of the upper pieces 13 and the lower pieces 14 of the spacer expander 12, and the ear parts 16 respectively push the side rails 11, 11 to an outer circumferential side. As illustrated in FIG. 2(b), as a modification of the spacer expander, a spacer expander 12' may have an ear part 16' that has a trapezoidal outer shape when observed from an outer diameter direction, and a through-hole 18 that is formed substantially similar to the outer shape along a radial direction.

As illustrated in FIG. 1, a side rail support part 19 protruding in the axial direction so as to abut on each of the side rails 11, 11 is formed in an outer circumferential end portion of each of the upper pieces 13 and the lower pieces 14 of the spacer expander 12.

A space forming part 20 spaced apart from the side rail support part 19 in the axial direction so as to form a space is provided, between the side rail 11 and an upper surface of an upper piece 13 or a lower surface of the lower piece 14. The space forming part 20 and the side rail support part 19 are continuous in the radial direction, through a continuous part 21 formed of a step that is substantially parallel to the space forming part 20 or a contact surface between the side rail support part 19 and the side rail 11. A space defined by the side rail 11, the side rail support part 19, the space forming part 20, the continuous part 21, and the ear part 16 is open toward the inner circumferential side through the through-hole 18 formed in the ear part 16, but is not open toward the outer circumferential side and is closed.

A groove 17 is formed along the radial direction on each of the space forming part 20. A sectional shape of the groove 17 along the axial direction is a V shape. The V shape herein includes not only a shape having adjacent oblique surfaces that intersect with each other at a sharp angle, but also a shape having adjacent oblique surfaces that are continuous with each other while describing a circular arc.

It is preferable that a length (distance A in FIG. 1) along the axial direction from the upper surface or the lower surface of the side rail support part 19 to the continuous part 21 be set smaller than a plate thickness of the spacer expander 12. For example, if the plate thickness of the spacer expander 12 is set to 0.17 to 0.28 mm, the length is set smaller than the plate thickness. This is because the side rail support part 19 will be open toward the outer circumferential side in the continuous part 21 if the distance A is set larger than the plate thickness.

It is preferable that a length (distance B in FIG. 1) of the continuous part 21 in the radial direction be set to be equal to or less than 0.2 mm, and a depth (distance C in FIG. 1) along the axial direction of the groove 17 be set to 0.10 to 0.23 mm. With this configuration, a large capacity of the space forming part 20 can be achieved, and a larger amount of engine oil can be discharged. It is preferable that a depth from the side rail support part 19 to the bottom (lower end) of the space forming part 20, as illustrated in FIG. 1, be set to be equal to or less than 0.40 mm.

In a state where the combined oil ring 10 is assembled in the oil ring groove 3 of the piston 2, the gap abut against each other, and the spacer expander 12 is contracted in the circumferential direction. Accordingly, the combined oil ring 10 is assembled such that expansion force is generated outward in the radial direction by tension of the spacer expander 12. Hence, the upper and lower side rails 11, 11 are vertically held by the side rail support parts 19, 19 of the upper pieces 13 and the lower pieces 14 along the axial direction, and the ear parts 16 respectively push inner circumferential surfaces of the side rails 11, whereby outer circumferential surfaces of the upper and lower side rails 11, 11 are brought into close contact with an inner wall surface of the cylinder 1.

As described above, the combined oil ring 10 according to the present embodiment includes the space forming part 20 that is spaced apart from the side rail support part 19 in the axial direction, the space forming part 20 and the side rail support part 19 are continuous through the continuous part 21, the groove 17 that is communicated with the through-hole 18 in the ear part 16 is formed in the space forming part 20 along the radial direction, and the outer circumferential end portion of the space forming part 20 and the continuous part 21 are not open toward the outer circumferential side and are closed. Accordingly, a large space defined by the ear part 16, the space forming part 20, the continuous part 21, and the side rail support part 19 can be secured, whereby a larger amount of engine oil can be discharged from the through-hole 18 and deposition of carbon sludge between the side rail 11 and the spacer expander 12 can be prevented.

In the combined oil ring 10 according to the present embodiment, the continuous part 21 has a step. Accordingly, the continuous part 21 can be formed easily, and a larger amount of engine oil can be discharged from the through-hole 18, whereby deposition of carbon sludge can be prevented effectively.

In the combined oil ring 10 according to the present embodiment, the groove 17 is formed into a substantial V shape protruding upward or downward in the axial direction. Accordingly, a large volume of space between the side rail 11 and the spacer expander 12 can be secured, and engine oil is allowed to smoothly flow out through the through-hole 18, whereby deposition of carbon sludge can be prevented.

In the combined oil ring 10 according to the present embodiment, the ear part 16' has a trapezoidal shape when observed from an outer diameter direction. Accordingly, the through-hole can be formed larger, and a larger amount of engine oil can be discharged from the through-hole 18, whereby deposition of carbon sludge can be prevented.

In the combined oil ring 10 according to the present embodiment, a shape of the through-hole 18 when observed from the outer diameter direction is substantially similar to an outer shape of the ear part 16. Accordingly, a larger amount of engine oil can be discharged from the through-hole 18, whereby deposition of carbon sludge can be prevented.

As illustrated in FIG. 3, the continuous part 21 may be formed as a circular arc part 21a that extends in a circular arc shape in axial section, from an inner circumferential end portion of the side rail support part 19 toward the space forming part 20.

In this case, engine oil flowed in between the side rail 11 and the spacer expander 12 is allowed to smoothly flow out into the through-hole 18, along the circular arc shape of the circular arc part 21a. Accordingly, deposition of carbon sludge can be prevented even more effectively.

Next, the present invention is described more in detail by way of examples and a comparative example.

EXAMPLES

In each example, there is adopted a combined oil ring with the above-mentioned space forming part formed thereon including two side rails and a spacer expander and having the following dimensions and shape. The two side rails had the same shape.

Example 1

Plate thickness of spacer expander: 0.265 mm, width thereof in axial direction (vertical direction in FIG. 1): 2.0 mm, and thickness thereof in radial direction (horizontal direction in FIG. 1): 2.05 mm, Distance (distance A) along axial direction between upper surface (or lower surface) of side rail support part and continuous part: 0.157 mm, Length (distance B) in radial direction of continuous part: 0.08 mm, Depth (distance C) of groove: 0.19 mm, Sectional shape of groove: V shape Example 2

Plate thickness of spacer expander: 0.280 mm, width thereof in axial direction (vertical direction in FIG. 1): 2.0 mm, and thickness thereof in radial direction (horizontal direction in FIG. 1): 2.05 mm, Distance (distance A) along axial direction between upper surface (or lower surface) of side rail support part and continuous part: 0.165 mm, Length (distance B) in radial direction of continuous part: 0.08 mm, Depth (distance C) of groove: 0.20 mm, Sectional shape of groove: V shape.

In each of the comparative example and the conventional example, a combined oil ring having the following dimensions and shape was used.

Comparative Example

Plate thickness of spacer expander: 0.280 mm, width thereof in axial direction (vertical direction in FIG. 1): 2.0 mm, and thickness thereof in radial direction (horizontal direction in FIG. 1): 2.05 mm, Continuous part in Examples 1 and 2 not formed, Bottom of distance A (lower end in axial direction in FIG. 1) and upper end of distance C formed as same position, Step along axial direction between side rail support part and upper end of space forming part: 0.08 mm, Depth of groove from upper end of space forming part: 0.18 mm, Sectional shape of groove: V shape, Through-hole formed in ear part.

Conventional Example

Plate thickness of spacer expander: 0.280 mm, width thereof in axial direction: 2.0 mm, and thickness thereof in radial direction: 2.05 mm, Step along axial direction between side rail support part and space forming part: 0.07 mm, Through-hole formed in ear part (V shaped groove not formed).

[Experiment for Checking Amount of Deposited Sludge]

In an actual machine experiment using a gasoline engine for an automobile (a displacement of 1.6 liters, an in-line four-cylinder type) in which the combined oil ring according to each of the examples, the comparative example, and the conventional example was assembled, an amount of sludge deposited on a piston ring was checked. For operating conditions, a speed of the gasoline engine for an automobile was set to 4,000 rpm, and operating time thereof was set to 300 hours. Engine oil used in this experiment was deteriorated, and an oil return hole was expected to be closed by the sludge. Amounts of deposited sludge were each shown as a ratio when an amount of deposited sludge in the conventional example was defined as 1.

Figure 4:
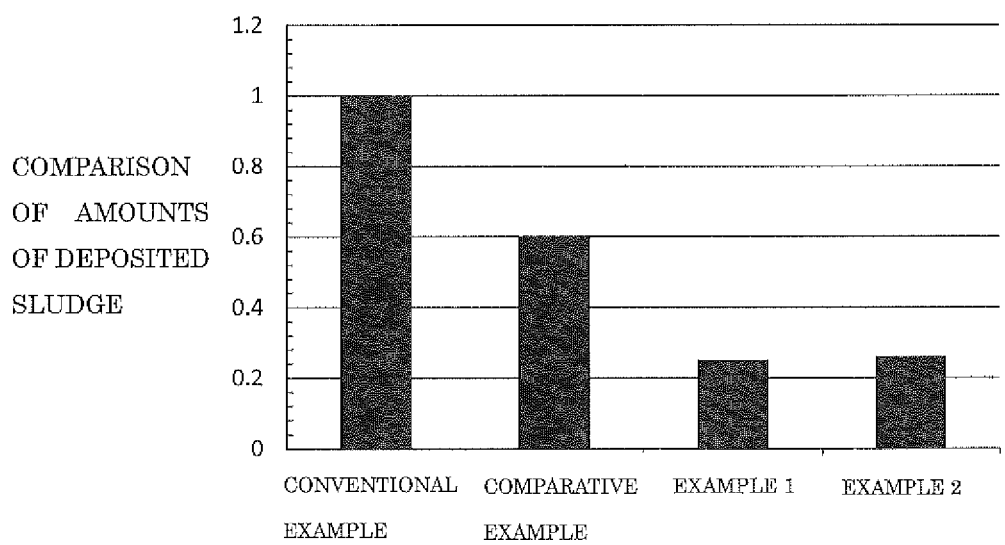
FIG. 4 shows experiment results of amounts of deposited sludge of the combined oil ring according to the embodiment of the present invention.

As is apparent from checking experiment results shown in FIG. 4, an amount of deposited sludge in Example 1 significantly decreases to about 20% of that in the conventional example. Although an amount of deposited sludge in the comparative example decreases to 60% of that in the conventional example, comparing the comparative example with the examples, an amount of deposited sludge in each example further decreases by about 40% with respect to that in the comparative example.

As described above, even compared with the conventional combined oil ring, in the combined oil ring according to each example, the amount of sludge deposited between the side rails and the spacer expander can be significantly reduced even if the internal combustion engine is operated for a long period of time. Accordingly, the combined oil ring according to each example can be considered to have optimal dimensions and shape.

In the combined oil ring 10 according to the present embodiment described above, the sectional shape of the groove 17 is a V shape. The sectional shape of the groove 17 is not limited thereto, and may be, for example, an R shape in section. The continuous part 21 is formed as a substantially horizontal single step from the side rail support part 19 in the description. However, the continuous part 21 may be formed of multiple steps, or may be a step that is tilted with respect to the side rail support part. As is apparent from contents of Claims, modes to which such change or improvement as described above is given can also be included in a technical scope of the present invention.

REFERENCE SIGNS LIST 1 cylinder, 2 piston, 3 oil ring groove, 10 combined oil ring, 11 side rail, 12, 12' spacer expander, 13 upper piece, 14 lower piece, 15 coupling piece, 16, 16' ear part, 17 groove, 18 through-hole, 19 side rail support part, 20 space forming part, 21, 21a continuous part

The invention claimed is:

1. A combined oil ring to be fitted in an oil ring groove of a piston, comprising:
    a pair of upper and lower flat plate-like circular side rails; and
    a spacer expander arranged between the pair of upper and lower side rails,
    the spacer expander including:
        a large number of upper pieces and lower pieces that are alternately arranged in a circumferential direction so as to be spaced apart in an axial direction and the circumferential direction;
        coupling pieces that respectively couple the adjacent upper pieces and lower pieces; and
        ear parts that are each formed so as to erect in an inner circumferential end portion of each of the upper pieces and the lower pieces, and serve to push the side rails, wherein:
    a side rail support part that abuts on the side rail is provided in an outer circumferential end portion of at least one of an upper surface of each upper piece and a lower surface of each lower piece;

a space forming part spaced apart from the side rail support part in the axial direction is provided in any one of the upper surface of the upper piece and the lower surface of the lower piece, such that a space is formed between the side rail and any one of the upper surface of the upper piece and the lower surface of the lower piece;

the space forming part and the side rail support part are continuous in the radial direction through a continuous part;

a groove that is communicated with a through-hole in the ear part is formed in the space forming part along the radial direction;

an outer circumferential end portion of the space forming part and the continuous part are not open toward the outer circumferential side and are closed, and the continuous part has a step including a radially extending portion and an axially extending portion, the axially extending portion extending substantially parallel to any one of the side rail support part and the space forming part.

2. The combined oil ring according to claim 1, wherein the groove is formed into a substantial V shape protruding upward or downward in the axial direction.

3. The combined oil ring according to claim 1, wherein the ear part has a trapezoidal shape when observed from an outer diameter direction.

4. The combined oil ring according to claim 1, wherein a shape of the through-hole when observed from an outer diameter direction is substantially similar to an outer shape of the ear part.

5. The combined oil ring according to claim 1, wherein a length along the axial direction from an upper surface or a lower surface of the side rail support part to the continuous part is set smaller than a plate thickness of the spacer expander.

6. The combined oil ring according to claim 1, wherein a length of the continuous part in the radial direction is set to be equal to or less than 0.2 mm.

7. The combined oil ring according to claim 1, wherein a depth of the groove is set to be equal to or more than 0.10 mm.

* * * * *

UNITED STATES PATENT AND TRADEMARK OFFICE
CERTIFICATE OF CORRECTION

PATENT NO. : 10,520,085 B2  
APPLICATION NO. : 15/560579  
DATED : December 31, 2019  
INVENTOR(S) : Yasuyuki Murata et al.

Page 1 of 1

It is certified that error appears in the above-identified patent and that said Letters Patent is hereby corrected as shown below:

On the Title Page

Under "(72) Inventors:"  
Delete "Kazumoto"  
Insert --Kazutomo--

Signed and Sealed this  
Twenty-fourth Day of March, 2020

Andrei Iancu  
*Director of the United States Patent and Trademark Office*